(12) United States Patent
Westwood et al.

(10) Patent No.: US 10,749,335 B2
(45) Date of Patent: Aug. 18, 2020

(54) METHOD OF OPERATION A DIFFERENTIAL PROTECTION SCHEME

(71) Applicant: GENERAL ELECTRIC TECHNOLOGY GMBH, Baden (CH)

(72) Inventors: John Westwood, Rugeley (GB); Yanzhong Zhang, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/097,340

(22) PCT Filed: Apr. 11, 2017

(86) PCT No.: PCT/EP2017/058664
§ 371 (c)(1),
(2) Date: Oct. 29, 2018

(87) PCT Pub. No.: WO2017/178481
PCT Pub. Date: Oct. 19, 2017

(65) Prior Publication Data
US 2019/0140440 A1    May 9, 2019

(30) Foreign Application Priority Data

Apr. 13, 2016 (EP) .................................. 16275054

(51) Int. Cl.
*H02H 7/26* (2006.01)
*H02H 1/00* (2006.01)
(Continued)

(52) U.S. Cl.
CPC .......... *H02H 7/261* (2013.01); *H02H 1/0061* (2013.01); *H02H 3/28* (2013.01);
(Continued)

(58) Field of Classification Search
CPC ........ H02H 7/261; H02H 1/0061; H02H 3/30; H02J 13/0013; H04J 3/0641
See application file for complete search history.

(56) References Cited

U.S. PATENT DOCUMENTS

2009/0295231 A1    12/2009  Gaffney et al.
2014/0169157 A1*   6/2014   Pan ..................... H04L 41/0668
                                                 370/228
2014/0321261 A1*  10/2014   Lee ....................... H04L 12/437
                                                 370/216

FOREIGN PATENT DOCUMENTS

EP         2744130 A2     6/2014
WO        2011039074 A1   4/2011
WO        2013009260 A1   1/2013

OTHER PUBLICATIONS

European Search Report and Written Opinion dated Aug. 29, 2016 which was issued in connection with EP patent application No. 16275054.1 which was filed on Apr. 13, 2016.
(Continued)

*Primary Examiner* — Brian A Zimmerman
*Assistant Examiner* — Kevin Lau
(74) *Attorney, Agent, or Firm* — Eversheds Sutherland (US) LLP

(57) ABSTRACT

There is provided a method of operating a reconfigurable differential protection scheme for carrying out differential protection of an electrical power network, the electrical power network comprising terminals, each of the terminals configured to be in communication with each other within a communications network. The method includes controlling the differential protection scheme to deactivate the differential protection, and selecting a terminal to be configured out of or into the differential protection scheme. The method also includes communicating reconfiguration information among the terminals, the reconfiguration information includ-
(Continued)

ing the selection of the terminal to be configured out of or into the differential protection scheme. The method also includes modifying a respective differential protection algorithm at each of the non-selected terminals so as to configure the selected terminal out of or into the differential protection scheme, and controlling the differential protection scheme to reactivate the differential protection.

10 Claims, 13 Drawing Sheets

(51) Int. Cl.
    *H02H 3/30*     (2006.01)
    *H02J 13/00*     (2006.01)
    *H04J 3/06*     (2006.01)
    *H02H 3/28*     (2006.01)

(52) U.S. Cl.
    CPC ........... *H02H 3/30* (2013.01); *H02J 13/0013* (2013.01); *H04J 3/0638* (2013.01); *H04J 3/0641* (2013.01); *Y02E 60/7807* (2013.01); *Y04S 40/12* (2013.01)

(56) References Cited

OTHER PUBLICATIONS

International Search Report and Written Opinion dated Jun. 28, 2017 which was issued in connection with PCT application No. PCT/EP2017/058664 which was filed on Apr. 11, 2017.

\* cited by examiner

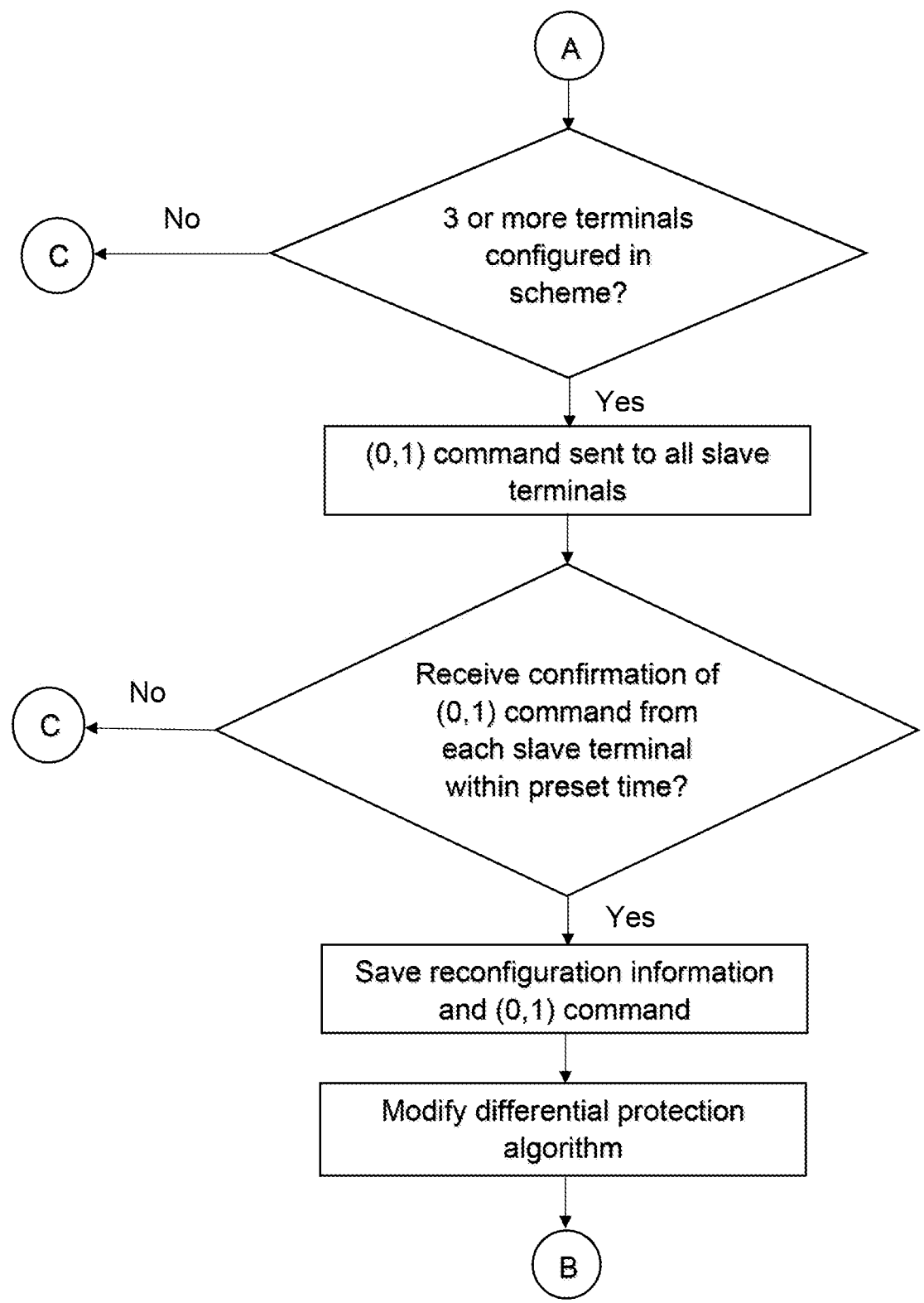
Figure 2A - continued

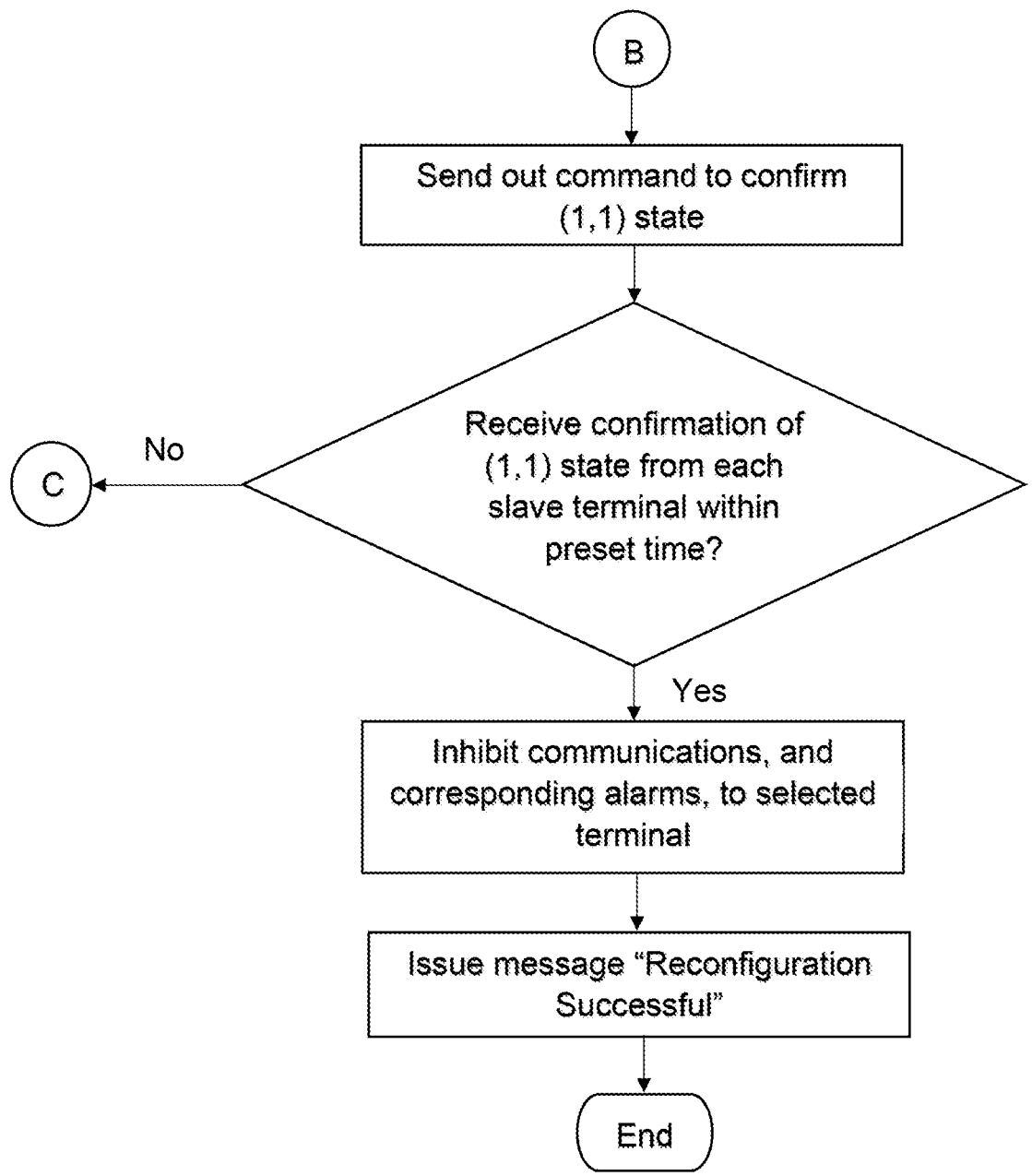
Figure 2A - continued

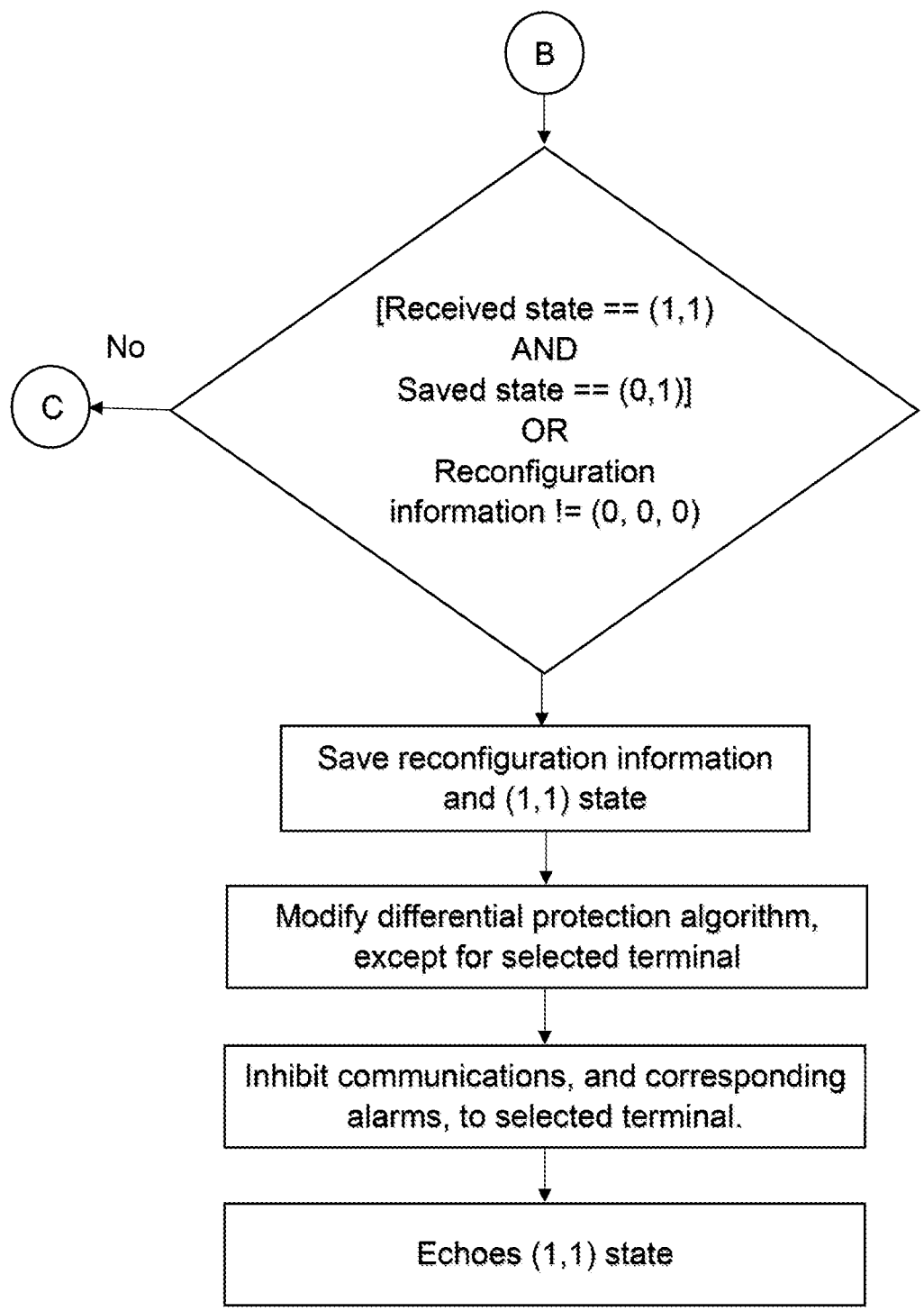
Figure 2B - continued

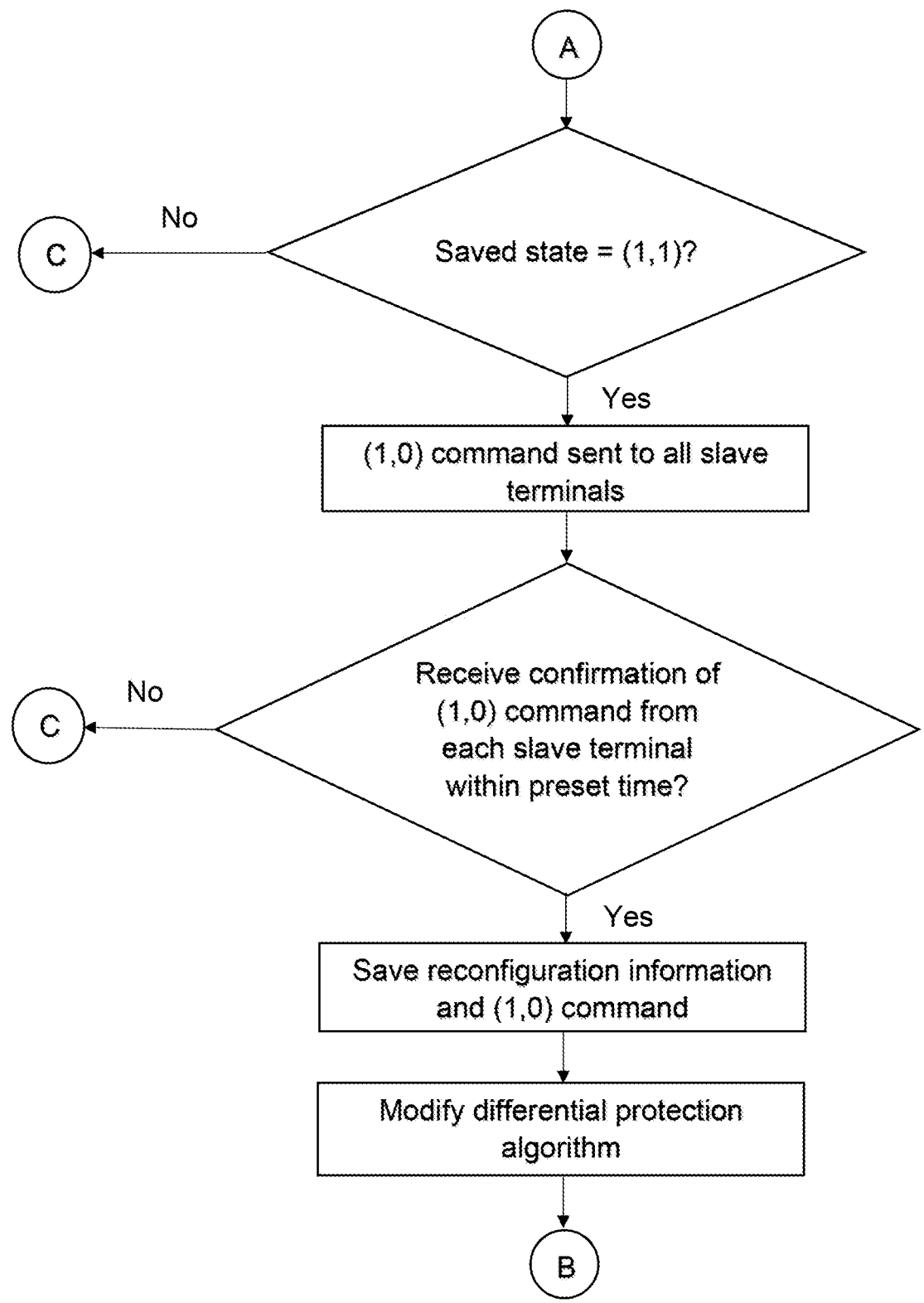
Figure 3A - continued

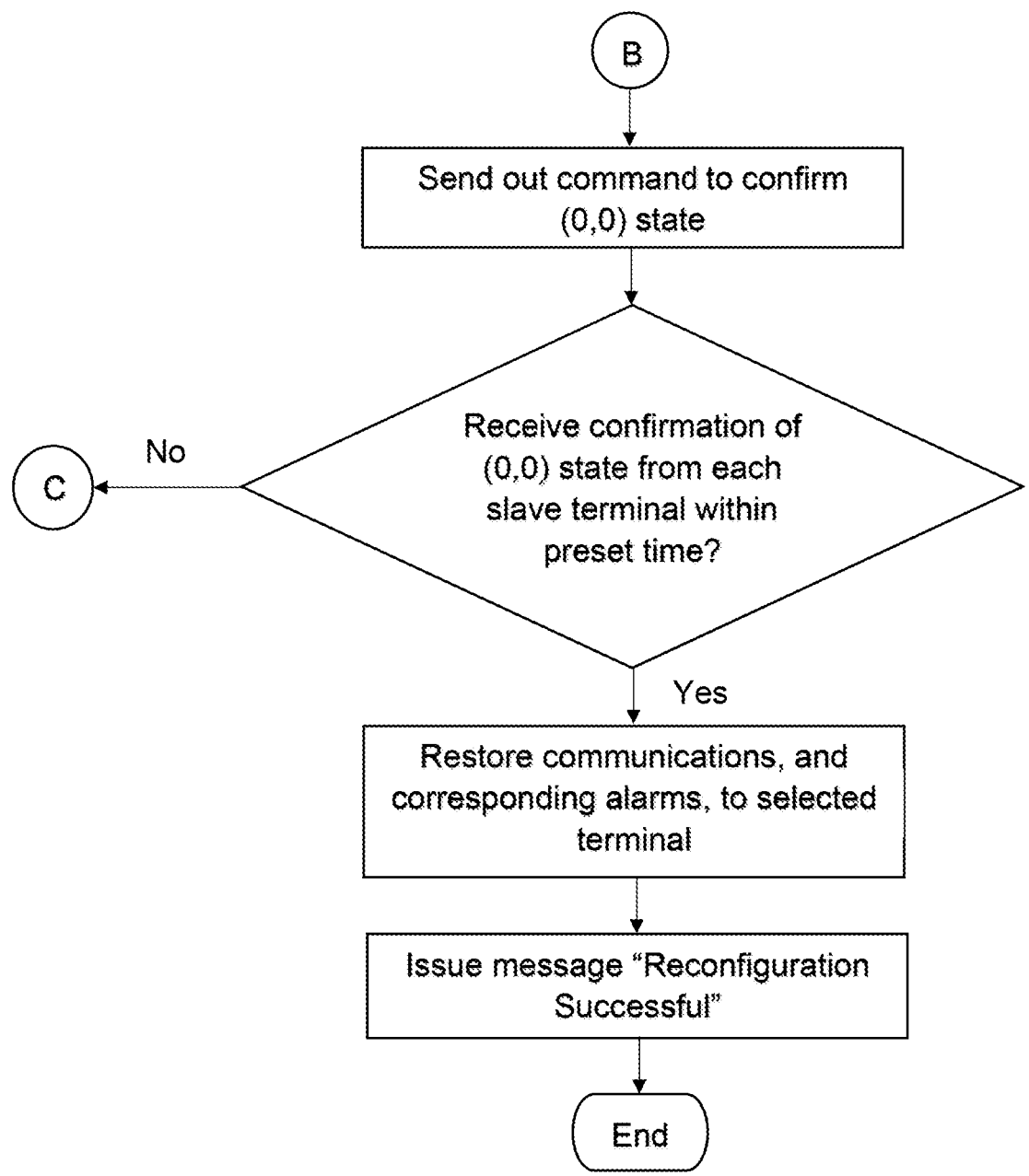
Figure 3A - continued

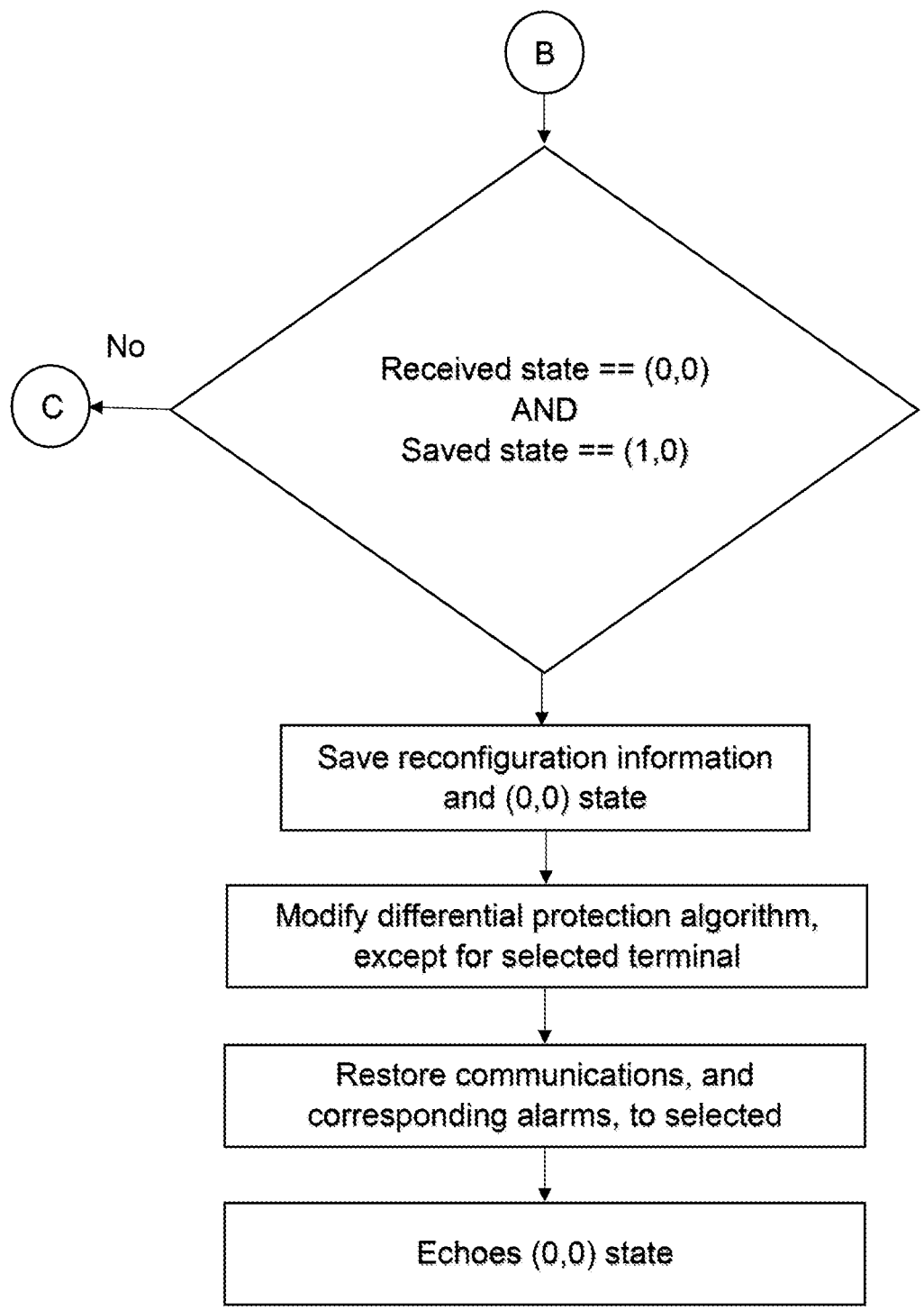
Figure 3B - continued

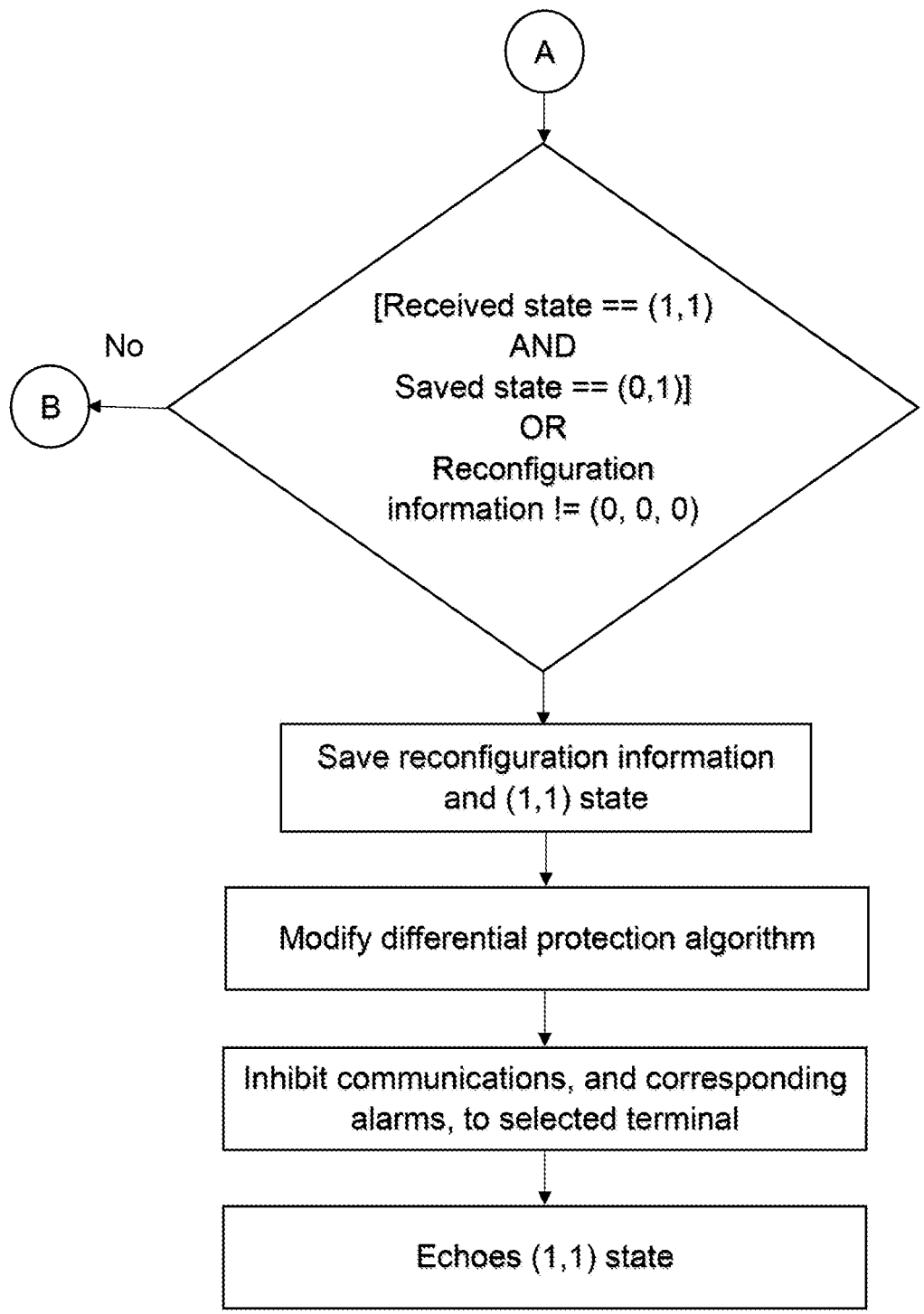
Figure 4 - continued

METHOD OF OPERATION A DIFFERENTIAL PROTECTION SCHEME

BACKGROUND

This invention relates to a method of operating a differential protection scheme, and to an electrical power network comprising a differential protection scheme.

Current differential protection schemes help to protect transmission lines within an electrical power system by identifying when a fault occurs in relation to the transmission lines. The basic principle of current differential protection is based on a calculation of a difference between the currents entering and leaving a protected zone. Tripping of a local circuit breaker is carried out when the difference exceeds a set trip threshold. In addition to tripping the local circuit breaker, a local terminal sends an intertrip signal to the remote terminals to ensure tripping at all ends of the protected zone.

BRIEF SUMMARY

According to a first aspect of the invention, there is provided a method of operating a reconfigurable differential protection scheme for carrying out differential protection of an electrical power network, the electrical power network comprising a plurality of terminals, each of the plurality of terminals configured to be in communication with each other of the plurality of terminals within a communications network, the method includes:
  controlling the differential protection scheme to deactivate the differential protection;
  selecting a terminal to be configured out of or into the differential protection scheme;
  communicating reconfiguration information among the plurality of terminals via the communications network, the reconfiguration information including the selection of the terminal to be configured out of or into the differential protection scheme, wherein the communications network is any one of: a daisy-chain communications network; a ring communications network; a meshed communications network; a star communications network; a bus communications network; a tree communications network; or a hybrid thereof;
  after communicating the reconfiguration information among the plurality of terminals, modifying a respective differential protection algorithm at each of the non-selected terminals so as to configure the selected terminal out of or into the differential protection scheme; and
  controlling the differential protection scheme to reactivate the differential protection.

The method of operating a reconfigurable differential protection scheme according to the invention enables the addition of a terminal into or the removal of a terminal from the differential protection scheme. Such addition or removal of a terminal may be desirable under certain circumstances in order to ensure that the differential protection scheme continues to effectively and reliably carry out differential protection of the electrical power network. Otherwise failure to reconfigure the differential protection scheme under such circumstances could result in errors in the differential protection of the electrical power network and thereby could damage the electrical power network.

As set out above, the communications network is any one of: a daisy-chain communications network; a ring communications network; a meshed communications network; a star communications network; a bus communications network; a tree communications network; or a hybrid thereof. The communications protocol employed by such a communications network allows the reconfiguration information to be communicated among the plurality of terminals in the same way (e.g. by way of transmission of an identical message) regardless of the number of terminals. In addition the topology of such a communications network means that it is straightforward to increase or decrease the number of terminals in the communications network. As a result, the provision of such a communications network to communicate the reconfiguration information among the plurality of terminals renders the method of the invention readily scalable to accommodate any number of terminals (e.g. 3, 4, 5, 6 or more) in the electrical power network, while at the same time obviating the need for any substantial redesign in terms of communications protocol and hardware.

Furthermore, the provision of such a communications network to communicate the reconfiguration information among the plurality of terminals in the method of the invention removes the need for direct point-to-point communication between the plurality of terminals whereby each terminal is required to be directly connected, via direct point-point communication links, to each of the other terminals. More so, it would not be practical to employ a reconfigurable differential protection scheme based on direct point-to-point communication between the plurality of terminals in an electrical power network with more than 3 terminals, due to the cost and complexity in implementing direct point-point communication links between the terminals. By way of example, where 6 is the number of terminals, direct point-to-point communication between the plurality of terminals requires 30 communication links, whereas the communications network of the invention requires significantly fewer than 30 communications links, e.g. a ring communications network based on 6 terminals only requires 6 communication links between the plurality of terminals.

In embodiments of the invention, when a terminal is selected to be configured out of the differential protection scheme, the method may further include the step of enabling an interlock on the selected terminal, wherein the interlock when disabled inhibits the configuration of the selected terminal out of the differential protection scheme, and the interlock when enabled permits the configuration of the selected terminal out of the differential protection scheme.

The provision of an interlock ensures that a given terminal can be configured out of the differential protection scheme only when it is selected.

In further embodiments of the invention, the method may further include the step of confirming that the status of the communication of each of the plurality of terminals with each other of the plurality of terminals is healthy, prior to the step of communicating reconfiguration information among the plurality of terminals via the communications network.

This step may be included in the method of the invention to ensure the reliable communication of the reconfiguration information among all of the plurality of terminals via the communications network.

In still further embodiments of the invention, when a terminal is selected to be configured into the differential protection scheme, the method may further include the step of confirming that the selected terminal is configured out of the differential protection scheme prior to the step of communicating reconfiguration information among the plurality of terminals via the communications network.

This step may be included in the method of the invention to ensure that the reconfiguration of a terminal into the differential protection scheme only takes place if a terminal is presently configured out of the differential protection scheme.

Optionally the method may further include the step of confirming that the reconfiguration information has been communicated among the plurality of terminals within a preset time prior to the step of modifying a respective differential protection algorithm at each of the non-selected terminals so as to configure the selected terminal out of or into the differential protection scheme.

This step may be included in the method of the invention to ensure that the modification of the respective differential protection algorithm takes place at each of the non-selected terminals.

Further optionally the method may further include the step of confirming that the reconfigured differential protection scheme has stabilised subsequent to the step of modifying a respective differential protection algorithm at each of the non-selected terminals so as to configure the selected terminal out of or into the differential protection scheme.

This step may be included in the method of the invention to ensure that the reconfiguration of the differential protection scheme is carried out properly.

When a terminal is selected to be configured out of the differential protection scheme, the method may further include the step of deactivating the selected terminal and/or inhibiting communication to the selected terminal subsequent to the modification of the respective differential protection algorithm so as to configure the selected terminal out of the differential protection scheme.

This step may be included in the method of the invention to ensure that the configured-out terminal does not unintentionally play a role in the differential protection of the electrical power network, which could lead to maloperation of the differential protection scheme.

When a terminal is selected to be configured into the differential protection scheme, the method may further include the step of modifying a differential protection algorithm at the selected terminal so as to configure the selected terminal into the differential protection scheme.

This step may be included in the method of the invention to ensure that the configured-in terminal correctly performs its role in the differential protection of the electrical power network. This is particularly beneficial when the differential protection algorithm at the selected terminal is not up-to-date or has been previously altered.

In embodiments of the invention, wherein one of the plurality of terminals has failed, the method may further include:
  replacing the failed terminal with a substitute terminal;
  configuring each of the remaining terminals to be in communication with the substitute terminal within the communications network;
  communicating the reconfiguration information to the substitute terminal via the communications network; and
  after communicating the reconfiguration information to the substitute terminal, modifying the differential protection algorithm at the substitute terminal so as to configure the selected terminal out of or into the differential protection scheme.

These steps may be included in the method of the invention to ensure that the reconfiguration of the differential protection scheme can still take place in the event of failure of one of the plurality of terminals of the electrical power network. The communications protocol employed by the communications network allows the reconfiguration information to be readily communicated to the substitute terminal that is newly added to the communications network, without requiring a substantial redesign of the communications protocol. In addition the topology of the communications network means that it is straightforward to replace the failed terminal with the substitute terminal in the communications network.

According to a second aspect of the invention, there is provided an electrical power network comprising a plurality of terminals, each of the plurality of terminals configured to be in communication with each other of the plurality of terminals within a communications network, the electrical power network further including a reconfigurable differential protection scheme for carrying out differential protection of the electrical power network, the differential protection scheme configured to:
  control the differential protection scheme to deactivate the differential protection;
  select a terminal to be configured out of or into the differential protection scheme;
  communicate reconfiguration information among the plurality of terminals via the communications network, the reconfiguration information including the selection of the terminal to be configured out of or into the differential protection scheme, wherein the communications network is any one of: a daisy-chain communications network; a ring communications network; a meshed communications network; a star communications network; a bus communications network; a tree communications network; or a hybrid thereof;
  after communicating the reconfiguration information among the plurality of terminals, modify a respective differential protection algorithm at each of the non-selected terminals so as to configure the selected terminal out of or into the differential protection scheme; and
  control the differential protection scheme to reactivate the differential protetion.

The features and advantages of the method of the first aspect of the invention and its embodiments apply mutatis mutandis to the electrical power network of the second aspect of the invention.

BRIEF DESCRIPTION OF THE DRAWINGS

Embodiments of the invention will now be described, by way of non-limiting examples, with reference to the accompanying drawings in which.

DETAILED DESCRIPTION

Figure 1:
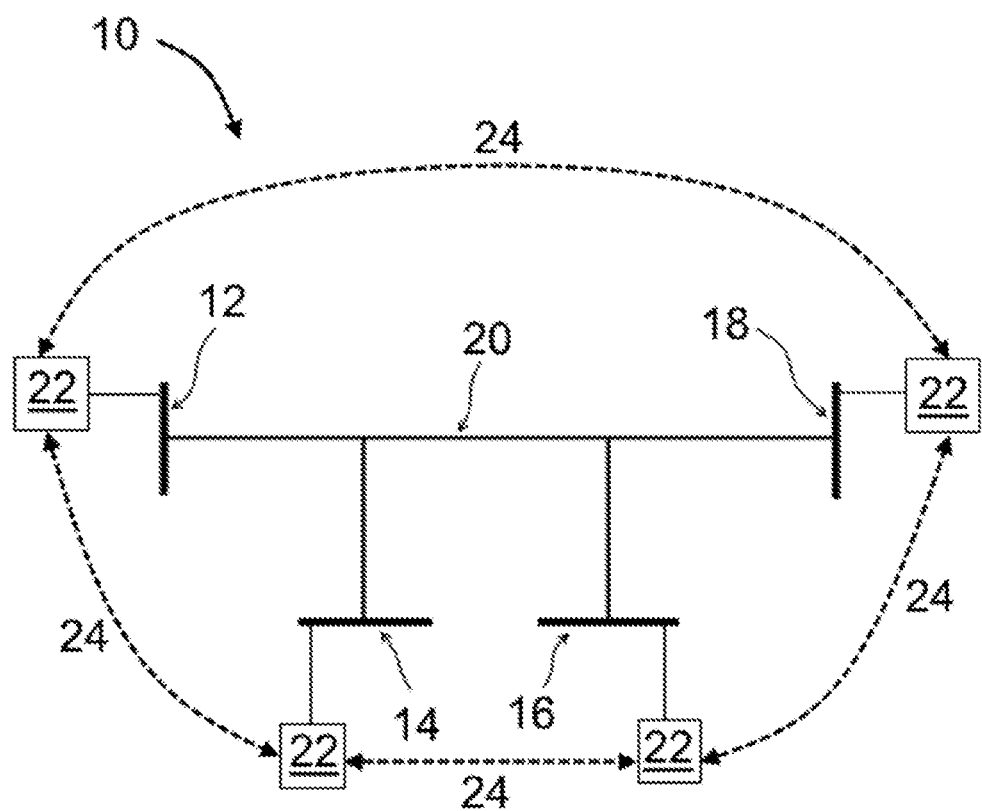
FIG. 1 shows a schematic representation of an exemplary electrical power network having a plurality of terminals to which a method according to a first embodiment of the invention may be applied.

An exemplary electrical power network is shown in Figure 1 and is designated generally by reference numeral 10.

The electrical power network 10 includes first, second, third and fourth terminals 12, 14, 16 and 18 that are interconnected by a portion of transmission medium 20 which, in the example shown is an overhead transmission line. In other arrangements of the electrical power network (not shown) the transmission medium 20 may be an underground transmission cable.

Each terminal 12, 14, 16, 18 includes a differential protection element (not shown) which may, for example, be a circuit breaker. Each terminal 12, 14, 16, 18 also includes a control unit 22 which may take the form of, e.g. a programmable microcontroller or an intelligent electronic device. Each control unit 22 controls operation of the corresponding differential protection element, and the terminals via their control units 22 are arranged to communicate with one another via communications links 24 arranged to form a ring communications network. The terminals 12, 14, 16, 18 (in particular their respective differential protection elements and control units 22) form part of a multi-ended differential protection scheme for carrying out differential protection of the electrical power network 10.

In the electrical power network 10, the terminals 12, 14, 16, 18 are associated with respective terminal addresses A, B, C, D. The provision of the ring communications network to link the control units 22 of terminals 12, 14, 16, 18 means that the terminals 12, 14, 16, 18 communicate with each other in the address order A-B-C-D-A. That is to say, as shown in FIG. 1:

- a first communications channel of the terminal 12 is directly connected to a second communications channel of the terminal 14 to link the corresponding control units 22, and a second communications channel of the terminal 12 is directly connected to a first communications channel of the terminal 18 to link the corresponding control units 22;
- a first communications channel of terminal 14 is directly connected to a second communications channel of the terminal 16 to link the corresponding control units 22; and
- a first communications channel of the terminal 16 is directly connected to a second communications channel of the terminal 18 to link the corresponding control units 22.

The topology of the ring communications network also permits indirect communication between terminals 12, 14, 16, 18 that are not directly linked to each other. That is to say, the terminals 12 and 16 communicate with each other via the terminals 14 and 18, and the terminals 14 and 18 communicate with each other via the terminals 12 and 16.

The basic principle of current differential protection is based on a calculation of a difference between the currents entering and leaving a protected zone. Tripping of a local differential protection element (e.g. circuit breaker) is carried out when the difference exceeds a set trip threshold. In addition to tripping the local differential protection element, a local terminal sends an intertrip signal to the remote terminals to ensure tripping at all ends of the protected zone. Each terminal 12, 14, 16, 18 operates in accordance with a differential protection algorithm, which is stored locally in the corresponding control unit 22, in order to perform its role in the differential protection scheme. The differential protection algorithm at each terminal 12, 14, 16, 18 is devised to take into account all of the terminals 12, 14, 16, 18 in the differential protection scheme.

There may be a need to reconfigure the differential protection scheme under certain circumstances. Reconfiguration of the differential protection scheme involves configuring a selected terminal out of or into the differential protection scheme. A selected terminal may be required to be configured out of the differential protection scheme due to, for example, failure of the selected terminal or the need to perform maintenance on the selected terminal, while a selected terminal may be required to be configured into the differential protection scheme due to, for example, restoration of the selected terminal to a normal operating state.

Configuring a selected terminal out of the differential protection scheme out requires the differential protection algorithm at each remaining terminal to be adapted to take into account the remaining terminals in the differential protection scheme but ignore the configured-out terminal. Configuring a selected terminal into the differential protection scheme out requires the differential protection algorithm at each remaining terminal to be adapted to take into account all of the terminals in the differential protection scheme, including the newly configured-in terminal.

A method according to a first embodiment of the invention reconfigures the differential protection scheme by configuring a selected terminal out of or into the differential protection scheme.

Control data is saved locally in the control unit 22 of each terminal 12, 14, 16, 18. The method of the first embodiment of the invention involves the transmission of the control data in an identical message among the terminals 12, 14, 16, 18 via the ring communications network, which permits the reconfiguration of the differential protection scheme to be carried out by accessing the control unit 22 of a local terminal. For ease of reference, the local terminal is referred to hereon as a master terminal, while the other terminals are referred to hereon as slave terminals.

In the method according to the first embodiment of the invention, the terminal 12 is designated as the master terminal, while the other terminals 14, 16 and 18 are designated as slave terminals. It will be appreciated that any of the plurality of terminals 12, 14, 16, 18 may be designated as the master terminal.

In the embodiment shown, the message is in the form of one byte of information, but it will be appreciated that the message may take other forms.

The first three bits in the control data define reconfiguration information, which includes an encoded terminal address A, B, C, D of the selected terminal to be configured out of or into the scheme, as follows:

$0^{th}$, $1^{st}$ and $2^{nd}$ bits: (0, 0, 1)—terminal 12 selected;
$0^{th}$, $1^{st}$ and $2^{nd}$ bits: (0, 1, 0)—terminal 14 selected;
$0^{th}$, $1^{st}$ and $2^{nd}$ bits: 1, 1)—terminal 16 selected; and
$0^{th}$, $1^{st}$ and $2^{nd}$ bits: (1, 0, 0)—terminal 18 selected.

For the purposes of illustrating the working of the method according to the first embodiment of the invention, the terminal 14 is designated as the selected terminal, but it will be appreciated that the method according to the first embodiment of the invention applies mutatis mutandis to any of the other terminals 12, 16, 18 as the selected terminal.

Encoding the $0^{th}$, $1^{st}$ and $2^{nd}$ bits as (0, 0, 0) indicates that the reconfiguration of the differential protection scheme is disabled, while the remaining possible combinations of the $0^{th}$, $1^{st}$ and $2^{nd}$ bits are unused and can be reserved for future use, e.g. if the method is applied to the electrical power network 10 with more than four terminals.

The $3^{rd}$ and $4^{th}$ bits in the control data are used as flags for the configuration state of the differential protection scheme, as follows:

$3^{rd}$ and $4^{th}$ bits: (0, 0)—"stable scheme with all terminals restored" state;

$3^{rd}$ and $4^{th}$ bits: (0, 1)—"terminal configure-out" command;

$3^{rd}$ and $4^{th}$ bits: (1, 0)—"terminal configure-in" command; and $3^{rd}$ and $4^{th}$ bits: (1, 1)—"stable scheme with one terminal configured out" state.

The $5^{th}$ bit is used to indicate the deactivation of the differential protection, and is set to 1 for true and 0 for false. The $6^{th}$ bit is used to indicate the enablement of an interlock associated with the selected terminal 14, and is set to 1 for true and 0 for false. The $7^{th}$ bit is unused and can be reserved for future use.

The default states of the control data in the transmitted message will be as follows: the reconfiguration information will be set to (0, 0, 0) to indicate that the reconfiguration of the differential protection scheme is disabled;

the $3^{rd}$ and $4^{th}$ bits for the configuration state of the differential protection scheme will be set to (0, 0) to indicate a "stable scheme with all terminals restored" state;

the $5^{th}$ bit for the differential protection deactivation flag will be set to false;

the $6^{th}$ bit for the interlock flag will be set to false.

Figure 2A:
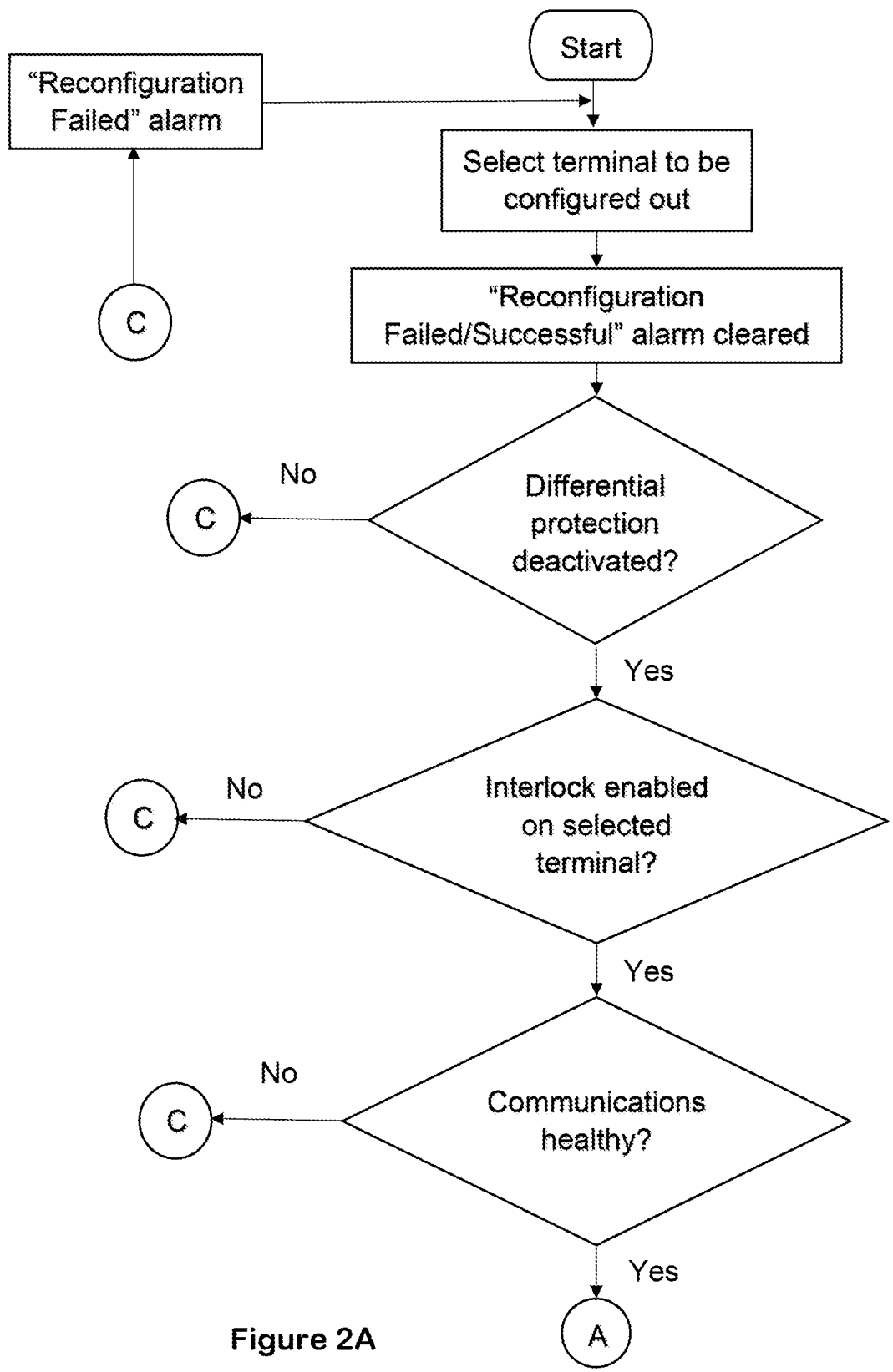
FIGS. 2A and 2B illustrate flow charts for performing steps of the method according to the first embodiment of the invention at master and slave terminals respectively when a terminal is configured out of a differential protection scheme.
Figure 2B:
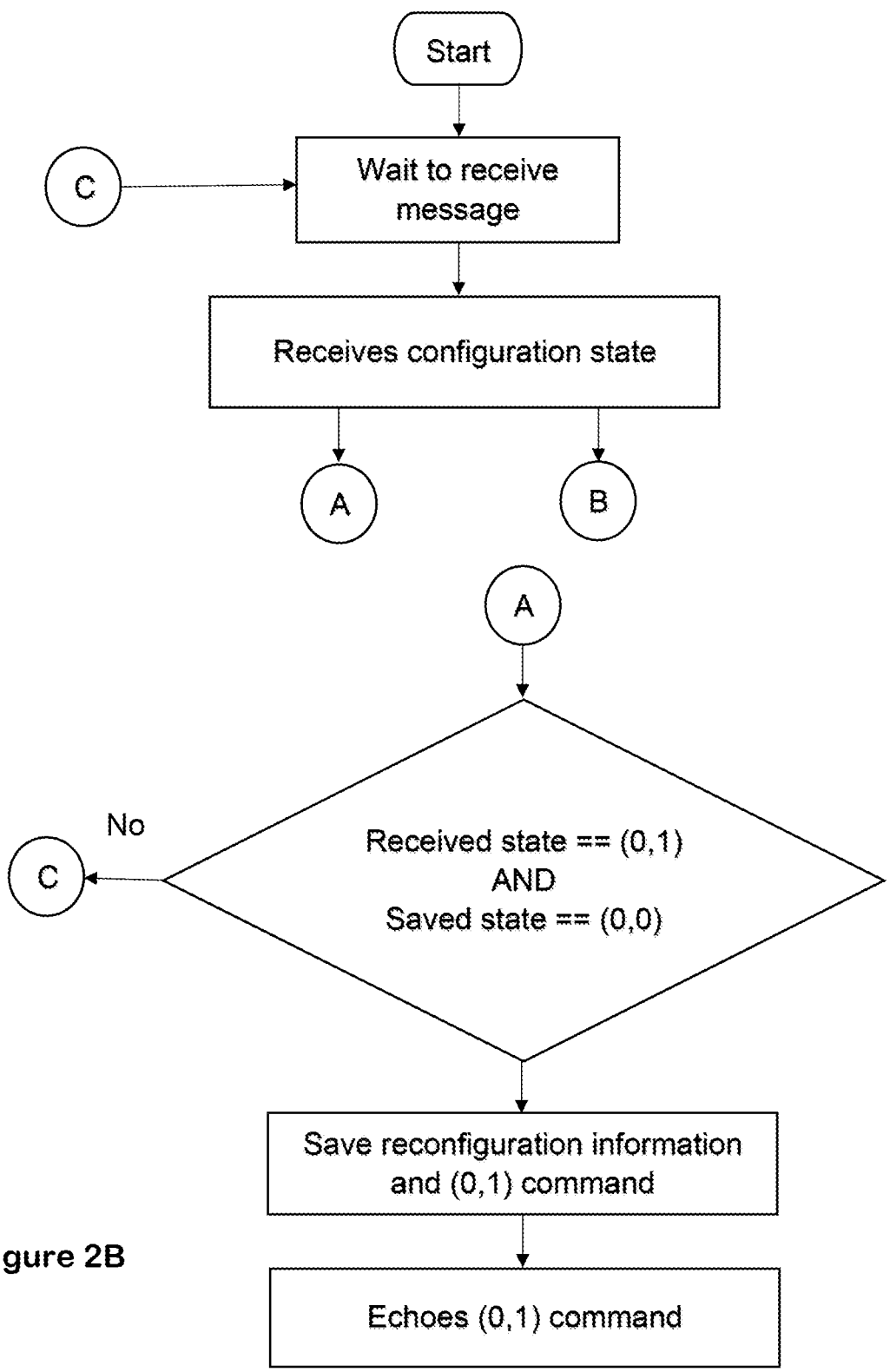

The following steps apply to the method of the first embodiment of the invention when the differential protection scheme is reconfigured by configuring a selected terminal 14 out of the differential protection scheme, with reference to FIGS. 2A and 2B.

Initially the control units 22 are operated to deactivate the differential protection. The deactivation may be carried out through binary input or control communications.

A terminal 14 is then selected to be configured out of the differential protection scheme. The control unit 22 of the master terminal 12 will display a setting/command cell (which is also available on the controls units of the other terminals 14, 16, 18) which will allow the user to select which terminal is be configured out of the differential protection scheme. The reconfiguration information is then altered to include the encoded terminal address B of the selected terminal 14 for configuration out of the differential protection scheme.

If there is any alarm set to indicate that a previous reconfiguration was successful or has failed, the alarm is cleared.

A check is carried out to confirm that the differential protection has been deactivated throughout the differential protection scheme. If the differential protection is not deactivated throughout the differential protection scheme, the reconfiguration is deemed to have failed and a corresponding alarm is activated.

If the differential protection is deactivated throughout the differential protection scheme, an interlock on the selected terminal 14 is enabled by using an optical isolated input. The interlock when disabled inhibits the configuration of the selected terminal 14 out of the differential protection scheme, and when enabled permits the configuration of the selected terminal 14 out of the differential protection scheme. Failure to enable the interlock on the selected terminal 14 will result in the reconfiguration being deemed to have failed and a corresponding alarm being activated.

The operation of the interlock is linked to the status of the corresponding differential protection element. When a differential protection element is opened, the corresponding interlock can be safely enabled. When a differential protection element is closed, the corresponding interlock is disabled. The link between the operation of the interlock and the status of the corresponding differential protection element provides a safety mechanism that prevents the configuration of a live terminal out of the differential protection scheme.

Following enablement of the interlock on the selected terminal 14, the master terminal 12 checks to confirm that the status of the communication of each of the plurality of terminals 12, 14, 16, 18 with each other of the plurality of terminals 12, 14, 16, 18 is healthy, i.e. communication throughout the ring communications network is healthy. Thereafter, the master terminal 12 checks to confirm that there are at least 3 terminals 12, 14, 16, 18 presently configured in the differential protection scheme. If either the communication throughout the ring communications network is healthy or there are two or fewer terminals presently configured in the differential protection scheme, the reconfiguration is deemed to have failed and a corresponding alarm is activated.

After confirming that the communication throughout the ring communications network is healthy and there are at least 3 terminals presently configured in the differential protection scheme, the reconfiguration information and a "terminal configure-out" command is then communicated to the slave terminals 14, 16, 18.

The master terminal 12 then waits for confirmation that the "terminal configure-out" command has been communicated to the slave terminals 14, 16, 18 within a preset time, e.g. 500 ms to 1 s. Meanwhile, with the saved configuration state at each slave terminal 14, 16, 18 being set as (0, 0), the receipt of the "terminal configure-out" command initiates the local saving of the reconfiguration information and the "terminal configure-out" command in the control unit 22 of each slave terminal 14, 16, 18. The control unit 22 of each slave terminal 14, 16, 18 then echoes the saved "terminal configure-out" command in the $3^{rd}$ and $4^{th}$ bits in the control data in the transmitted message.

If the confirmation is not received by the master terminal 12 in time, the reconfiguration is deemed to have failed and a corresponding alarm is activated.

If the confirmation is received by the master terminal 12 in time, the reconfiguration information and the "terminal configure-out" command is saved in the control unit 22 of the master terminal 12.

This is followed by modification of the differential protection algorithm at the master terminal 12 to configure the selected terminal 14 out of the differential protection scheme, and the communication of a "stable scheme with one terminal configured out" state from the master terminal 12 to the slave terminals 14, 16, 18. The master terminal 12 then waits for confirmation that the "stable scheme with one terminal configured out" state has been communicated to the slave terminals 14, 16, 18 within a preset time, e.g. 500 ms to 1 s.

With the saved configuration state at each slave terminal 14, 16, 18 presently being set as (0, 1), the receipt of the "stable scheme with one terminal configured out" state initiates the local saving of the reconfiguration information and the "stable scheme with one terminal configured out" state in the control unit 22 of each slave terminal 14, 16, 18. Receipt of the "stable scheme with one terminal configured out" state also triggers a check to ensure that the reconfiguration information is not set at (0, 0, 0) to indicate that the reconfiguration of the differential protection scheme is disabled. If the reconfiguration information is set at (0, 0, 0), then the local saving is inhibited.

Following initiation of the local saving, the differential protection algorithm at the terminals 16, 18 are then adapted to configure the selected terminal 14 out of the differential protection scheme. No change is made to the differential protection algorithm at the selected terminal 14, since the configured-out terminal 14 does not play a role in the differential protection of the electrical power network and therefore does not require its differential protection algorithm to be updated.

Thereafter, communication between the terminal 16 and the configured-out terminal 14 is inhibited, the corresponding alarm indicating failure of communication to the configured-out terminal 14 is suppressed, and then the control unit 22 of each slave terminal 14, 16, 18 then echoes the "stable scheme with one terminal configured out" state in the $3^{rd}$ and $4^{th}$ bits in the control data in the transmitted message.

If the confirmation is not received by the master terminal 12 in time, the reconfiguration is deemed to have failed and a corresponding alarm is activated.

If the confirmation is received by the master terminal 12 in time, the differential protection scheme is confirmed to have stabilised. Communication between the configured-out terminal 14 and the master terminal 12 is inhibited, and the corresponding alarm indicating failure of communication to the configured-out terminal 14 is suppressed. Finally a message confirming the successful reconfiguration of the differential protection scheme is issued.

At this stage, the configured-out terminal 14 is deactivated, the interlock on the configured-out terminal 14 is disabled, and the control units 22 of the terminals 12, 16, 18 are operated to reactivate the differential protection throughout the differential protection scheme.

Figure 3A:
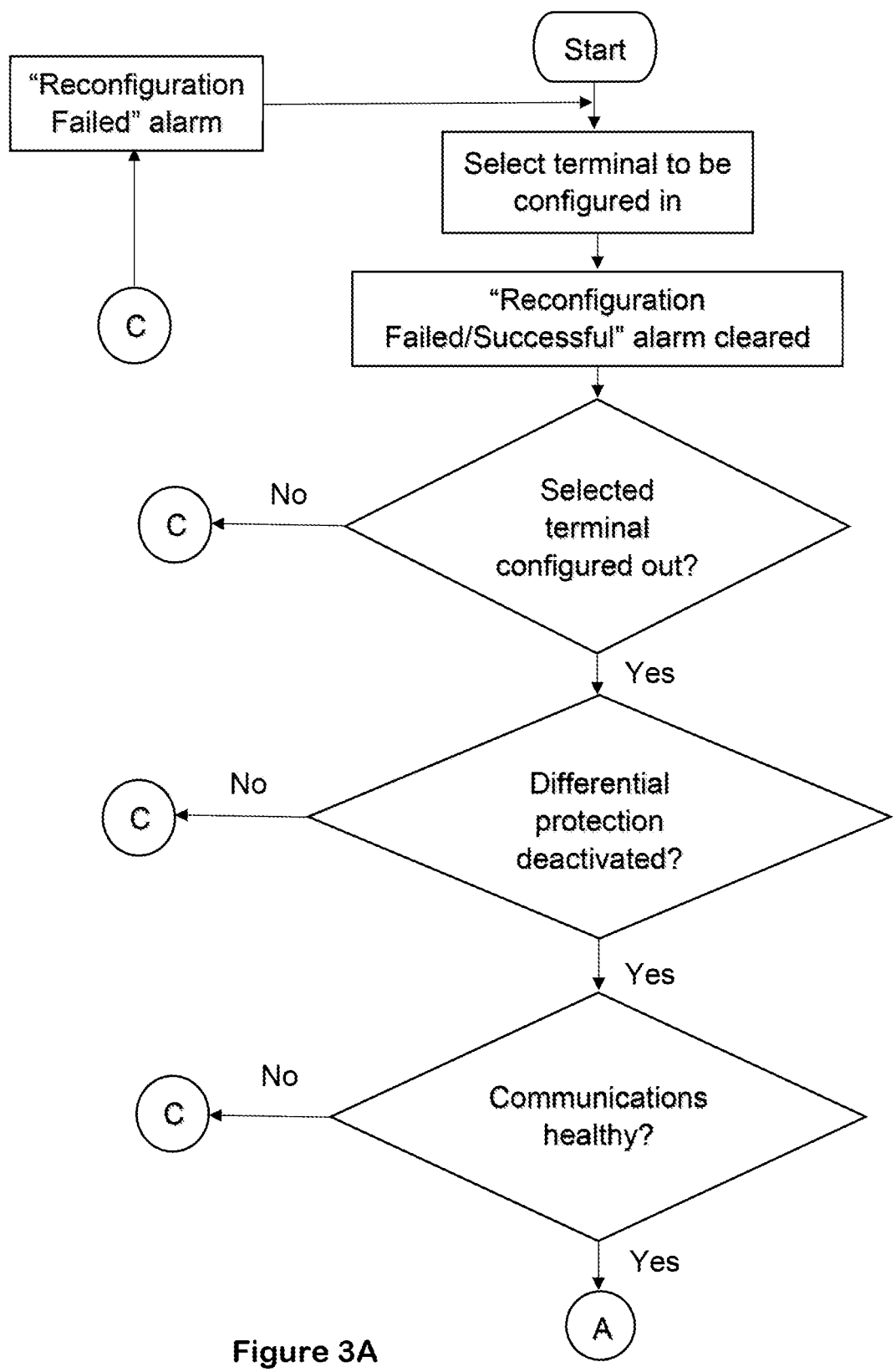
FIGS. 3A and 3B illustrate flow charts for performing steps of the method according to the first embodiment of the invention at master and slave terminals respectively when a terminal is configured into a differential protection scheme.
Figure 3B:
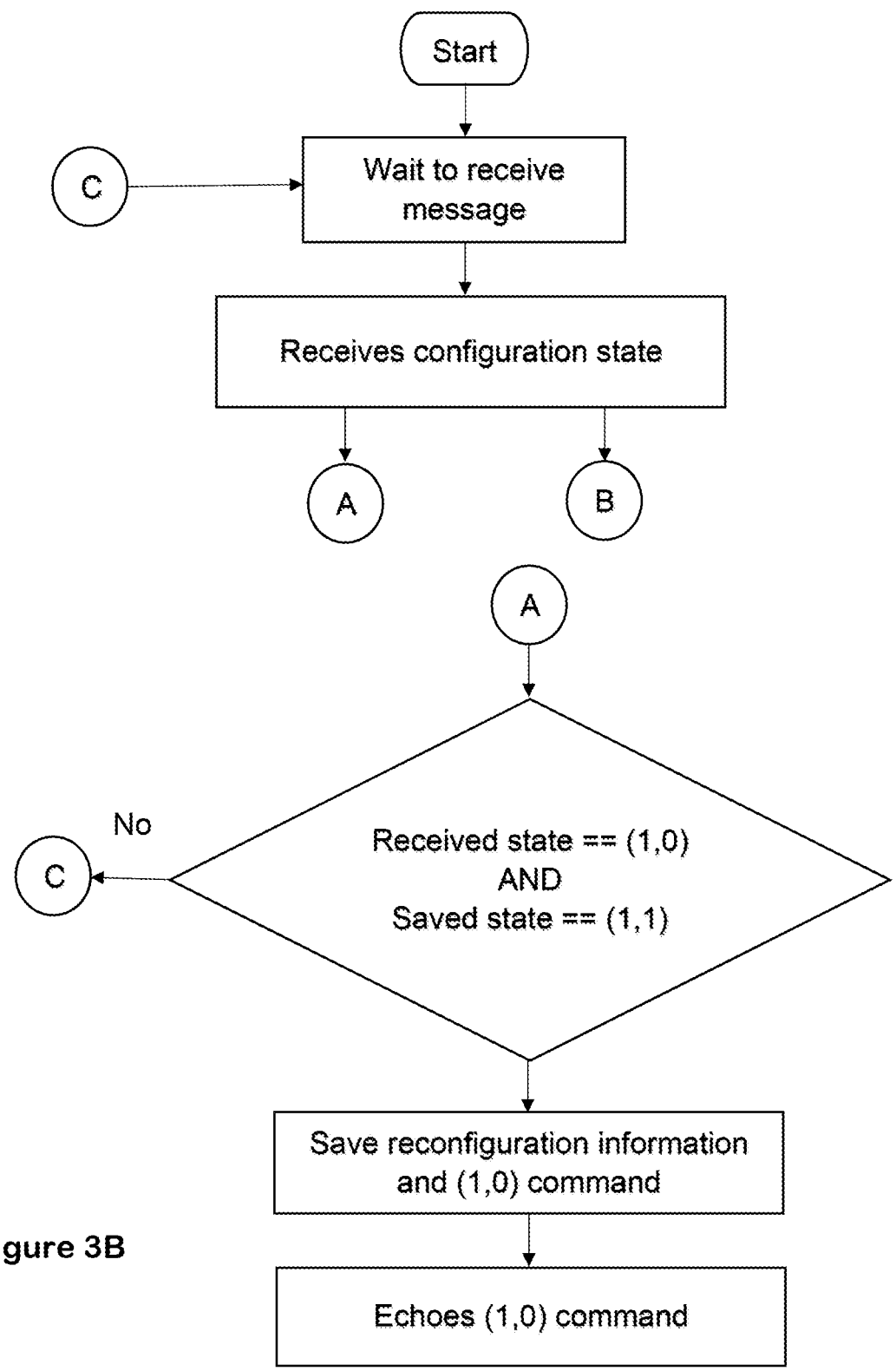

The following steps apply to the method of the first embodiment of the invention when the differential protection scheme is reconfigured by configuring a selected terminal 14 into the differential protection scheme, with reference to FIGS. 3A and 3B.

Initially the control units 22 are operated to deactivate the differential protection. The deactivation may be carried out through binary input or control communications.

A terminal 14 is then selected to be configured into the differential protection scheme. The control unit 22 of the master terminal 12 will display a setting/command cell (which is also available on the controls units of the other terminals 14, 16, 18) which will allow the user to select which terminal is be configured into the differential protection scheme. The reconfiguration information is then altered to include the encoded terminal address B of the selected terminal 14 for configuration into the differential protection scheme.

If there is any alarm set to indicate that a previous reconfiguration was successful or has failed, the alarm is cleared.

A check is carried out to confirm that a terminal 14 is configured out of the differential protection scheme. If the check returns a negative result, the reconfiguration is deemed to have failed and a corresponding alarm is activated.

If the check returns a positive result, another check is carried out to confirm that the differential protection has been deactivated throughout the differential protection scheme. If the differential protection is not deactivated throughout the differential protection scheme, the reconfiguration is deemed to have failed and a corresponding alarm is activated.

If the differential protection is deactivated throughout the differential protection scheme, the master terminal 12 checks to confirm that the status of the communication of each of the plurality of terminals 12, 14, 16, 18 with each other of the plurality of terminals 12, 14, 16, 18 is healthy, i.e. communication throughout the ring communications network is healthy. Thereafter, the master terminal 12 checks to confirm that the saved configuration state in the control unit 22 of the master terminal 12 is the "stable scheme with one terminal configured out" state. If either the communication throughout the ring communications network is healthy or the saved configuration state in the control unit 22 of the master terminal 12 is not the "stable scheme with one terminal configured out" state, the reconfiguration is deemed to have failed and a corresponding alarm is activated.

After confirming that the communication throughout the ring communications network is healthy and the saved configuration state in the control unit 22 of the master terminal 12 is the "stable scheme with one terminal configured out" state, the reconfiguration information and a "terminal configure-in" command is then communicated to the slave terminals 14, 16, 18.

The master terminal 12 then waits for confirmation that the "terminal configure-in" command has been communicated to the slave terminals 14, 16, 18 within a preset time, e.g. 500 ms to 1 s. Meanwhile, with the saved configuration state at each slave terminal 14, 16, 18 being set as (1, 1), the receipt of the "terminal configure-in" command initiates the local saving of the reconfiguration information and the "terminal configure-in" command in the control unit 22 of each slave terminal 14, 16, 18. The control unit 22 of each slave terminal 14, 16, 18 then echoes the saved "terminal configure-in" command in the $3^{rd}$ and $4^{th}$ bits in the control data in the transmitted message.

If the confirmation is not received by the master terminal 12 in time, the reconfiguration is deemed to have failed and a corresponding alarm is activated.

If the confirmation is received by the master terminal 12 in time, the reconfiguration information and the "terminal configure-in" command is saved in the control unit 22 of the master terminal 12.

This is followed by modification of the differential protection algorithm at the master terminal 12 to configure the selected terminal 14 into the differential protection scheme, and the communication of a "stable scheme with all terminals restored" state from the master terminal 12 to the slave terminals 14, 16, 18. The master terminal 12 then waits for confirmation that the "stable scheme with all terminals restored" state has been communicated to the slave terminals 14, 16, 18 within a preset time, e.g. 500 ms to 1 s.

With the saved configuration state at each slave terminal 14, 16, 18 presently being set as (1, 0), the receipt of the "stable scheme with all terminals restored" state initiates the local saving of the reconfiguration information and the "stable scheme with all terminals restored" state in the control unit 22 of each slave terminal 14, 16, 18. The differential protection algorithm at the terminals 16, 18 are then adapted to configure the selected terminal 14 into the differential protection scheme. No change is made to the differential protection algorithm at the selected terminal 14, which was not previously altered. However, if necessary, a step of modifying the differential protection algorithm at the selected terminal 14 so as to configure the selected terminal 14 into the differential protection scheme may be taken if the differential protection algorithm needs to be updated or was previously altered.

Thereafter, communication between the terminal 16 and the configured-in terminal 14 is restored, the corresponding alarm indicating failure of communication to the configured-in terminal 14 is restored, and then the control unit 22 of each slave terminal 14, 16, 18 then echoes the "stable scheme with all terminals restored" state in the $3^{rd}$ and $4^{th}$ bits in the control data in the transmitted message.

If the confirmation is not received by the master terminal 12 in time, the reconfiguration is deemed to have failed and a corresponding alarm is activated.

If the confirmation is received by the master terminal 12 in time, the differential protection scheme is confirmed to have stabilised. Communication between the configured-in terminal 14 and the master terminal 12 is restored, and the corresponding alarm indicating failure of communication to the configured-in terminal 14 is restored. Finally a message confirming the successful reconfiguration of the differential protection scheme is issued.

At this stage, the configured-in terminal 14 is reactivated, and the control units 22 of the terminals 12, 14, 16, 18 are operated to reactivate the differential protection throughout the differential protection scheme.

It can be seen from the foregoing that the provision of a ring communications network to communicate the reconfiguration information among the plurality of terminals renders the method of the invention readily scalable to accommodate any number of terminals in the electrical power network, while at the same time obviating the need for any substantial redesign in terms of communications protocol and hardware, and renders it practical to employ a reconfigurable differential protection scheme based on a ring communications network in an electrical power network with more than 3 terminals.

It is envisaged that, in other embodiments of the invention, the ring communications network may be replaced by or combined with any one of: a daisy-chain communications network; a meshed communications network; a star communications network; a bus communications network; a tree communications network; or a hybrid thereof, while maintaining the aforementioned advantages associated with the use of the ring communications network.

A method according to a second embodiment of the invention reconfigures the differential protection scheme by configuring a selected terminal out of the differential protection scheme, with the addition of steps of replacing a failed terminal being replaced by a substitute terminal.

For the purposes of illustrating the working of the method according to the second embodiment of the invention, the terminal 16 is designated as the failed terminal to be replaced, but it will be appreciated that the method according to the first embodiment of the invention applies mutatis mutandis to any of the other terminals 12, 14, 18 as the failed terminal to be replaced.

The functions of the master terminal 12 and the slave terminals 14, 18 in the method according to the second embodiment of the invention are identical to the functions of their counterparts in the method according to the first embodiment of the invention, with reference to FIGS. 2A, 2B, 3A and 3B.

Figure 4:
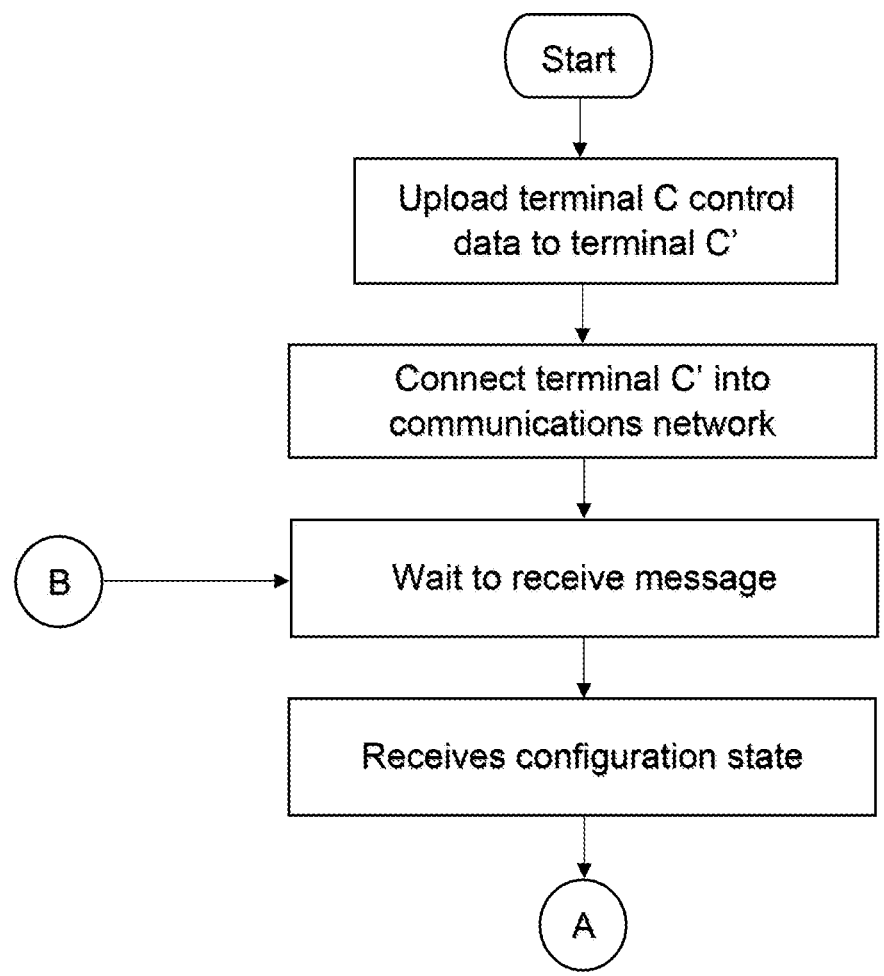
FIG. 4 illustrates a flow chart for performing steps of the method according to a second embodiment of the invention when replacing a failed terminal with a substitute terminal.

The additional steps of replacing a failed terminal being replaced by a substitute terminal are described as follows, with reference to FIG. 4.

Initially the control data saved in the control unit 22 of the terminal 16 is uploaded to the control unit 22 of the substitute terminal. The substitute terminal is assigned a terminal address C', a first communications channel of the terminal 14 is directly connected to a second communications channel of the substitute terminal to link the corresponding control units 22, and a first communications channel of the substitute terminal is directly connected to a second communications channel of the terminal 18 to link the corresponding control units 22.

The substitute terminal will initially transmit the default states of the control data. At this stage no action is taken by the substitute terminal to configure the selected terminal 14 out of the differential protection scheme. This is due to the combination of the reconfiguration information being set to indicate that the reconfiguration of the differential protection scheme is disabled, the saved configuration state at the substitute terminal being set to indicate a "stable scheme with one terminal configured out" state, and a received configuration state set to indicate a 'stable state with all terminals restored' state.

After the substitute terminal receives the "terminal configure-out" command from the master terminal 12, the reconfiguration information and the "terminal configure-out" command is locally saved in the control unit 22 of the substitute terminal. This is followed by the communication of a "stable scheme with one terminal configured out" state from the master terminal 12 to the substitute terminal. With the saved configuration state at each slave terminal 14, 18 presently being set as (0, 1), the receipt of the "stable scheme with one terminal configured out" state initiates the local saving of the reconfiguration information and the "stable scheme with one terminal configured out" state in the control unit 22 of each slave terminal 14, 18. Receipt of the "stable scheme with one terminal configured out" state also triggers a check to ensure that the reconfiguration information is not set at (0, 0, 0) to indicate that the reconfiguration of the differential protection scheme is disabled. If the reconfiguration information is set at (0, 0, 0), then the local saving is inhibited.

Following initiation of the local saving, the differential protection algorithm at the substitute terminal is then adapted to configure the selected terminal 14 out of the differential protection scheme. Thereafter, communication between the substitute terminal and the configured-out terminal 14 is inhibited, the corresponding alarm indicating failure of communication to the configured-out terminal 14 is suppressed, and then the control unit 22 of the substitute terminal then echoes the "stable scheme with one terminal configured out" state in the $3^{rd}$ and $4^{th}$ bits in the control data in the transmitted message.

In this way reconfiguration of the differential protection scheme can still take place in the event of failure of one of the plurality of terminals 12, 14, 16, 18 of the electrical power network.

It will be appreciated that the method according to the second embodiment of the invention apply mutatis mutandis to the reconfiguration of the differential protection scheme to configure a selected terminal into the differential protection scheme.

It will be understood that the topology of the electrical power network of the above-described specific embodiment of the invention is merely chosen as a non-limiting example to describe the principle of the invention and that the electrical power network may include a different number of terminals, e.g. 3, 5, 6 or higher.

It will also be understood that the sequence of steps of the method of the above-described and other embodiments of the invention is not fixed as described above. More particularly, it will be appreciated that some steps can be carried out in parallel or in reverse sequence if the steps are not required to be performed in a specific order.

What we claim is:

1. A method of operating a reconfigurable differential protection scheme for carrying out differential protection of an electrical power network, the electrical power network comprising a plurality of terminals, each of the plurality of terminals configured to be in communication with each other of the plurality of terminals within a communications network, the method comprising:
controlling the differential protection scheme to deactivate the differential protection;
selecting a terminal of the plurality of terminals to be configured out of or into the differential protection scheme;
communicating reconfiguration information among the plurality of terminals via the communications network, the reconfiguration information including the selection of the terminal to be configured out of or into the differential protection scheme, wherein the communications network is any one of: a daisy-chain communications network; a ring communications network; a meshed communications network; a star communications network; a bus communications network; a tree communications network; or a hybrid thereof;
after communicating the reconfiguration information among the plurality of terminals, modifying a respective differential protection algorithm at each of the non-selected terminals so as to configure the selected terminal out of or into the differential protection scheme; and
controlling the differential protection scheme to reactivate the differential protection.

2. The method according to claim 1, when the terminal is selected to be configured out of the differential protection scheme, the method further including enabling an interlock on the selected terminal, wherein the interlock when disabled inhibits the configuration of the selected terminal out of the differential protection scheme, and the interlock when enabled permits the configuration of the selected terminal out of the differential protection scheme.

3. The method according to claim 1, further including confirming that the status of the communication of each of the plurality of terminals with each other of the plurality of terminals is healthy prior to the step of communicating reconfiguration information among the plurality of terminals via the communications network.

4. The method according to claim 1, when the terminal of the plurality of terminals is selected to be configured into the differential protection scheme, the method further including the step of confirming that the selected terminal is configured out of the differential protection scheme prior to the step of communicating reconfiguration information among the plurality of terminals via the communications network.

5. The method according to claim 1 further including the step of confirming that the reconfiguration information has been communicated among the plurality of terminals within a preset time prior to modifying a respective differential protection algorithm at each of the non-selected terminals so as to configure the selected terminal out of or into the differential protection scheme.

6. The method according to claim 1, further including confirming that the reconfigured differential protection scheme has stabilised subsequent to modifying a respective differential protection algorithm at each of the non-selected terminals of the plurality of terminals so as to configure the selected terminal out of or into the differential protection scheme.

7. The method according to claim 1, when the terminal of the plurality of terminals is selected to be configured out of the differential protection scheme, the method further including deactivating the selected terminal and/or inhibiting communication to the selected terminal subsequent to the modification of the respective differential protection algorithm so as to configure the selected terminal out of the differential protection scheme.

8. The method according to claim 1, when a terminal is selected to be configured into the differential protection scheme, the method further including modifying a differential protection algorithm at the selected terminal so as to configure the selected terminal into the differential protection scheme.

9. The method according to claim 1, wherein one of the plurality of terminals has failed, the method further including:
replacing the failed terminal with a substitute terminal;
configuring each of the remaining terminals to be in communication with the substitute terminal within the communications network;
communicating the reconfiguration information to the substitute terminal via the communications network; and
after communicating the reconfiguration information to the substitute terminal, modifying the differential protection algorithm at the substitute terminal so as to configure the selected terminal out of or into the differential protection scheme.

10. An electrical power network comprising a plurality of terminals, each of the plurality of terminals configured to be in communication with each other of the plurality of terminals within a communications network, the electrical power network further including a reconfigurable differential protection scheme for carrying out differential protection of the electrical power network, the differential protection scheme configured to:
control the differential protection scheme to deactivate the differential protection;
select a terminal of the plurality of terminals to be configured out of or into the differential protection scheme;
communicate reconfiguration information among the plurality of terminals via the communications network, the reconfiguration information including the selection of the terminal to be configured out of or into the differential protection scheme, wherein the communications network is any one of: a daisy-chain communications network; a ring communications network; a meshed communications network; a star communications network; a bus communications network; a tree communications network; or a hybrid thereof;
after communicating the reconfiguration information among the plurality of terminals, modify a respective differential protection algorithm at each of the non-selected terminals so as to configure the selected terminal out of or into the differential protection scheme; and
control the differential protection scheme to reactivate the differential protection.

* * * * *